United States Patent
Lee et al.

(10) Patent No.: US 10,637,983 B2
(45) Date of Patent: Apr. 28, 2020

(54) ELECTRONIC DEVICE AND LOCATION-BASED INFORMATION SERVICE METHOD THEREWITH

(71) Applicant: SAMSUNG ELECTRONICS CO., LTD., Suwon-si, Gyeonggi-do (KR)

(72) Inventors: Sijun Lee, Suwon-si (KR); Taekwang Um, Suwon-si (KR); Dongju Lee, Suwon-si (KR); Gajin Song, Anyang-si (KR); Jaeyung Yeo, Seongnam-si (KR); Dasom Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/868,195

(22) Filed: Jan. 11, 2018

(65) Prior Publication Data

US 2018/0198907 A1 Jul. 12, 2018

(30) Foreign Application Priority Data

Jan. 12, 2017 (KR) .......................... 10-2017-0005005

(51) Int. Cl.
| | | |
|---|---|---|
| *H04W 4/02* | (2018.01) | |
| *H04L 29/08* | (2006.01) | |
| *H04W 4/024* | (2018.01) | |
| *G06F 16/487* | (2019.01) | |
| *H04M 1/725* | (2006.01) | |
| *H04W 4/029* | (2018.01) | |

(Continued)

(52) U.S. Cl.
CPC ...... *H04M 1/72572* (2013.01); *G06F 16/951* (2019.01); *G06F 16/9537* (2019.01); *H04L 67/18* (2013.01); *H04W 4/02* (2013.01); *H04W 4/029* (2018.02); *G06F 16/487* (2019.01); *H04L 67/22* (2013.01); *H04M 1/72569* (2013.01); *H04W 4/024* (2018.02)

(58) Field of Classification Search
CPC ....................................................... H04L 67/18
USPC ............................................. 455/456.1–456.6
See application file for complete search history.

(56) References Cited

U.S. PATENT DOCUMENTS 9,786,145 B2 * 10/2017 Oppenheimer ......... G06F 21/50
9,898,884 B1 * 2/2018 Arora .................... G07F 11/002
(Continued)

FOREIGN PATENT DOCUMENTS

| KR | 10-0668382 | 1/2007 |
|---|---|---|
| KR | 10-2012-0026433 | 3/2012 |

(Continued)

OTHER PUBLICATIONS

International Search Report dated Apr. 10, 2018 for PCT/KR2018/000553.

*Primary Examiner* — Joshua L Schwartz
(74) *Attorney, Agent, or Firm* — Nixon & Vanderhye P.C.

(57) ABSTRACT

An electronic device and user situation-adaptive location-based information service method therewith is provided. The location-based information service method of the present disclosure includes receiving, at the electronic device, an information service request; checking, upon receipt of the information service request, location information; retrieving first information associated with the location information; and determining a situation of a user of the electronic device in association with the location information based on the first information.

20 Claims, 8 Drawing Sheets

(51) Int. Cl.
   *G06F 16/951*     (2019.01)
   *G06F 16/9537*    (2019.01)

(56) References Cited

U.S. PATENT DOCUMENTS

| | | | |
|---|---|---|---|
| 2009/0005080 A1* | 1/2009 | Forstall | H04W 4/02 |
| | | | 455/456.3 |
| 2009/0299857 A1* | 12/2009 | Brubaker | G06Q 30/02 |
| | | | 705/14.66 |
| 2010/0004854 A1 | 1/2010 | Shin et al. | |
| 2013/0060641 A1* | 3/2013 | Al Gharabally | H04H 60/63 |
| | | | 705/14.66 |
| 2014/0167961 A1* | 6/2014 | Finlow-Bates | H04W 4/021 |
| | | | 340/541 |
| 2014/0259189 A1 | 11/2014 | Ramachandran | |
| 2015/0193809 A1* | 7/2015 | Bugenhagen | G06Q 30/0241 |
| | | | 705/14.4 |
| 2016/0183060 A1* | 6/2016 | Seyde | H04W 4/029 |
| | | | 455/456.3 |

FOREIGN PATENT DOCUMENTS

| | | |
|---|---|---|
| KR | 10-2014-0146251 | 12/2014 |
| KR | 10-1690052 | 12/2016 |

\* cited by examiner

ELECTRONIC DEVICE AND LOCATION-BASED INFORMATION SERVICE METHOD THEREWITH

CROSS-REFERENCE TO RELATED APPLICATION

This application is based on and claims priority under 35 U.S.C. § 119 to a Korean patent application filed on Jan. 12, 2017, in the Korean Intellectual Property Office and assigned Serial No. 10-2017-0005005, the entire disclosure of which is incorporated by reference herein in its entirety.

TECHNICAL FIELD

The present disclosure relates generally to a location-based information service method and, for example, to an electronic device and user situation-adaptive location-based information service method therewith.

BACKGROUND

Typically, an electronic device (such as a smartphone, a tablet personal computer (PC), a portable multimedia player (PMP), a personal digital assistant (PDA), a laptop PC, a wrist watch, and a head-mounted display (HMD)) is equipped with at least one of a global navigation satellite system (GNSS) module, a geomagnetic sensor, and an acceleration sensor, which can be used to locate the position of the electronic device. A user may receive various location-based services including a location-based contents service by means of the electronic device equipped with the location capability.

Typically, a location-based service is provided to the user based on the location information collected and provided by the electronic device without consideration of a device usage situation of the user.

SUMMARY

The present disclosure provides an electronic device and user situation-adaptive location-based information service method therewith that is capable of determining a user situation based on user data and surroundings data of a device collected by the electronic device and providing the user with the location-based information service in adaptation to the user situation.

In accordance with an example aspect of the present disclosure, a location-based information service method with an electronic device is provided. The location-based information service method includes receiving, at the electronic device, an information service request, checking location information upon receipt of the information service request, retrieving first information associated with the location information, and determining a situation of a user of the electronic device in association with the location information based on the first information.

In accordance with another example aspect of the present disclosure, an electronic device is provided. The electronic device includes a memory, an input device comprising input circuitry, a display, a communication module comprising communication circuitry, and a processor configured to control the communication module to receive an information service request, to check location information upon receipt of the information service request, to retrieve first information associated with the location information, and to determine a situation of a user of the electronic device in association with the location information based on the first information.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Hereinafter, the present disclosure will be described with reference to the accompanying drawings. Although various example embodiments are illustrated in the drawings and related detailed descriptions are discussed in the present disclosure, the present disclosure may have various modifications and several embodiments. However, various example embodiments of the present disclosure are not limited to a specific implementation form and it should be understood that the present disclosure includes all changes and/or equivalents, variations, alternatives and substitutes included in the spirit and scope of various example embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be understood to denote a certain characteristic, number, step, operation, constituent element, component or a combination thereof, but may not be understood to exclude the existence of or a possibility of addition of one or more other characteristics, numbers, steps, operations, elements, components or combinations thereof.

In various embodiments of the present disclosure, the expression "or" or "at least one of A and/or B" includes any or all of combinations of words listed together. For example, the expression "A or B" or "at least A and/or B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. On the other hand, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessory, an electronic tattoo, and a smart watch, or the like, but is not limited thereto.

According to some embodiments, the electronic device may be a smart home appliance having a communication function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame, or the like, but is not limited thereto.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Navigation Satellite System (GNSS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops, or the like, but is not limited thereto.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function, or the like, but is not limited thereto. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

Hereinafter, an electronic device according to various example embodiments will be described with reference to the accompanying drawings. As used herein, the term "user" may indicate a person who uses an electronic device or a device (e.g., an artificial intelligence electronic device) that uses an electronic device.

Figure 1:
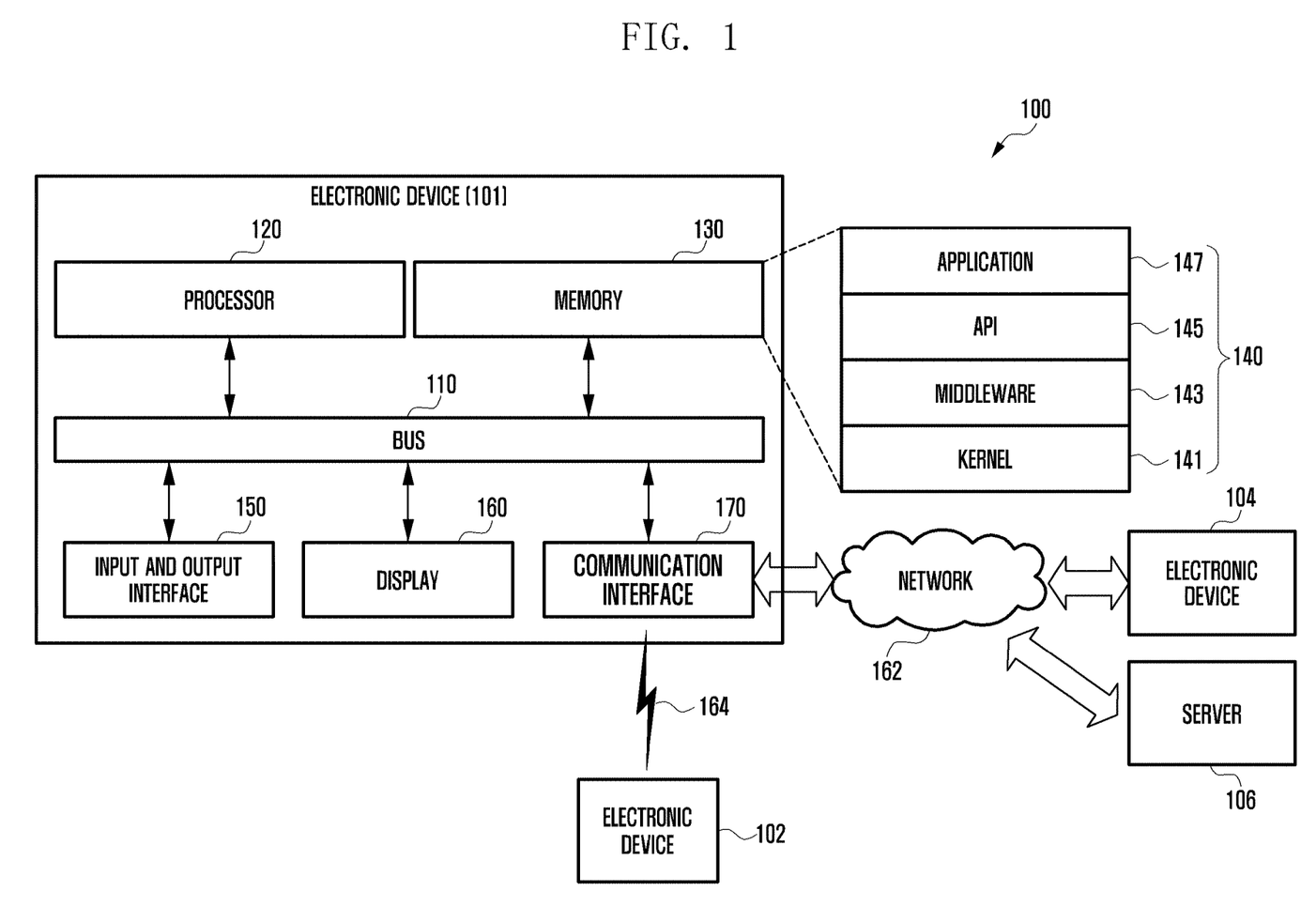
FIG. 1 is a diagram illustrating example electronic devices in a network environment according to various example embodiments of the present disclosure.

FIG. 1 illustrates a network environment 100 including an electronic device 101 according to various embodiments of the present disclosure. Referring to FIG. 1, the electronic device 101 includes a bus 110, a processor (e.g., including processing circuitry) 120, a memory 130, a input/output interface (e.g., including input/output circuitry) 150, a display 160 and a communication interface (e.g., including communication circuitry) 170.

The bus 110 may be a circuit connecting the above described components and transmitting communication (for example, a control message) between the above described components.

The processor 120 may include various processing circuitry and receives commands from other components (for example, the memory 130, the input/output interface 150, the display 160, the communication interface 170) through the bus 110, analyzes the received commands, and executes calculation or data processing according to the analyzed commands.

The memory 130 stores commands or data received from the processor 120 or other components (for example, the input/output interface 150, the display 160, or the communication interface 170) or generated by the processor 120 or other components. The memory 130 may include programming modules 140, for example, a kernel 141, middleware 143, an Application Programming Interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 145 is an interface by which the application 147 can control a function provided by the kernel 141 or the middleware 143 and includes, for example, at least one interface or function (for example, command) for a file control, a window control, image processing, or a character control.

The input/output interface 150 may include various input/output circuitry that can receive, for example, a command and/or data from a user, and transfer the received command and/or data to the processor 120 and/or the memory 130 through the bus 110. The display 160 can display an image, a video, and/or data to a user.

According to an embodiment, the display 160 may display a graphic user interface image for interaction between the user and the electronic device 100. The interface information may be in the form of, for example, a button, a menu, or an icon.

The communication interface 170 may include various communication circuitry that connects communication between the electronic device 100 and the external device (for example, electronic device 102, 104 or server 106). For example, the communication interface 160 may access a network 162 through wireless or wired communication to communicate with the external device. The communication interface 170 may establish a short-range wireless communication connection 164 to an electronic device, for example, electronic device 102. The wireless communication includes at least one of, for example, WiFi, BlueTooth (BT), Near Field Communication (NFC), a Global Navigation Satellite System (GNSS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the server 106 supports driving of the electronic device 100 by performing at least one operation (or function) implemented by the electronic device 100. For example, the server 106 may include a communication control server module that supports the communication interface 170 implemented in the electronic device 100. For example, the communication control server module may include at least one of the components of the communication interface 170 to perform (on behalf of) at least one operations performed by the communication interface 170.

Figure 2:
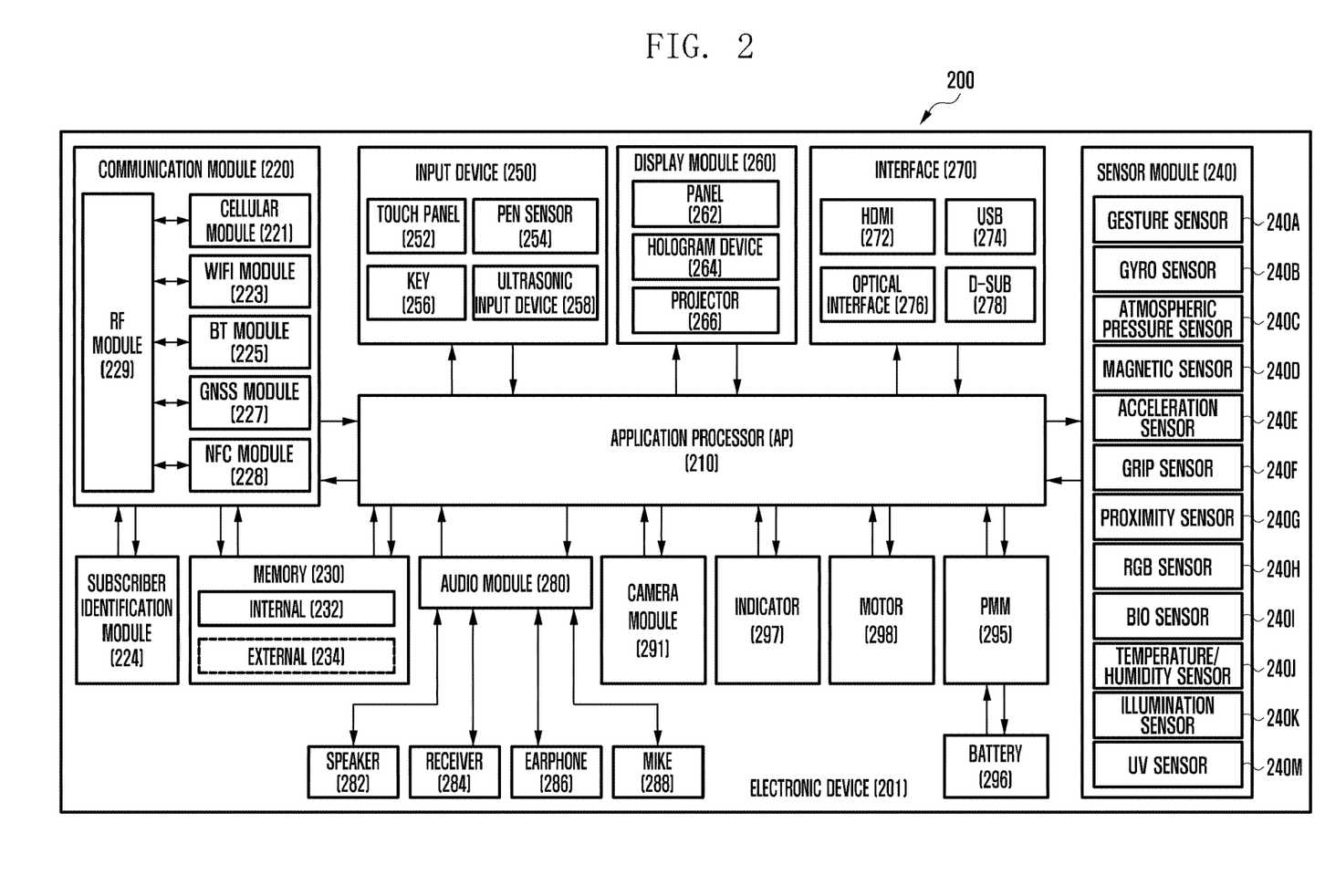
FIG. 2 is a block diagram illustrating an example configuration of an electronic device according to various example embodiments of the present disclosure.

FIG. 2 is a block diagram 200 illustrating an example electronic device 201 according to various embodiments of the present disclosure. The electronic device 201 may configure, for example, a whole or a part of the electronic device 101 illustrated in FIG. 1. Referring to FIG. 2, the electronic device 201 includes one or more Application Processors (APs) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display module 260, an interface (e.g., including interface circuitry) 270, an audio module 280, a camera module 291, a power managing module 295, a battery 296, an indicator 297, and a motor 298.

The AP 210 may include various processing circuitry and operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the processor 210 may further include a Graphic Processing Unit (GPU).

The communication module 220 (for example, communication interface 170) may include various processing circuitry and transmits/receives data in communication between different electronic devices (for example, the electronic device 104 and the server 106) connected to the electronic device 200 (for example, electronic device 100) through a network. According to an embodiment, the communication interface 220 may include various communication circuitry, such as, for example, and without limitation, a cellular module 221, a WiFi module 223, a BlueTooth (BT) module 225, a Global Navigation Satellite System (GNSS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

According to an embodiment, the AP 210 or the cellular module 221 (for example, communication processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GNSS module 227, and the NFC module 228 may include, for example, a processor for processing data transmitted/received through the corresponding module. Although the cellular module 221, the WiFi module 223, the BT module 225, the GNSS module 227, and the NFC module 228 are illustrated as blocks separate from each other in FIG. 8, at least some (for example, two or more) of the cellular module 221, the WiFi module 223, the BT module 225, the GNSS module 227, and the NFC module 228 may be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GNSS module 227, and the NFC module 228 may be implemented by one SoC.

The RF module 229 transmits/receives data, for example, an RF signal. Although not illustrated, the RF module 229 may include, for example, a transceiver, a PowerAmp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GNSS module 227, and the NFC module 228 share one RF module 229 in FIG. 2, at least one of the cellular module 221, the WiFi module 223, the BT module 225, the GNSS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 and/or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 may include various circuitry that measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (e.g., barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric (e.g., bio) sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 may further include a control circuit for controlling one or more sensors included in the sensor module 240.

The input device 250 may include various input circuitry, such as, for example, and without limitation, a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 200 through an input means generating an ultrasonic signal to identify data and can perform wireless recognition. According to an embodiment, the electronic device 200 receives a user input from an external device (for example, computer or server) connected to the electronic device 200 by using the communication interface 220.

The display module 260 (for example, display 160) includes a panel 262, a hologram device 264, and a projector 266. The panel 262 may be, for example, a Liquid Crystal Display (LCD) or an Active Matrix Organic Light Emitting Diode (AM-OLED), or the like, but is not limited thereto. The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 200. According to an embodiment, the display 260 may further include a control circuit for controlling the panel 262, the hologram device 264, and the projector 266.

The interface 270 may include various interface circuitry, such as, for example, and without limitation, one or more of a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 290 may include, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp).

The power managing module 295 manages power of the electronic device 200. Although not illustrated, the power managing module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery.

The indicator 297 shows particular statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
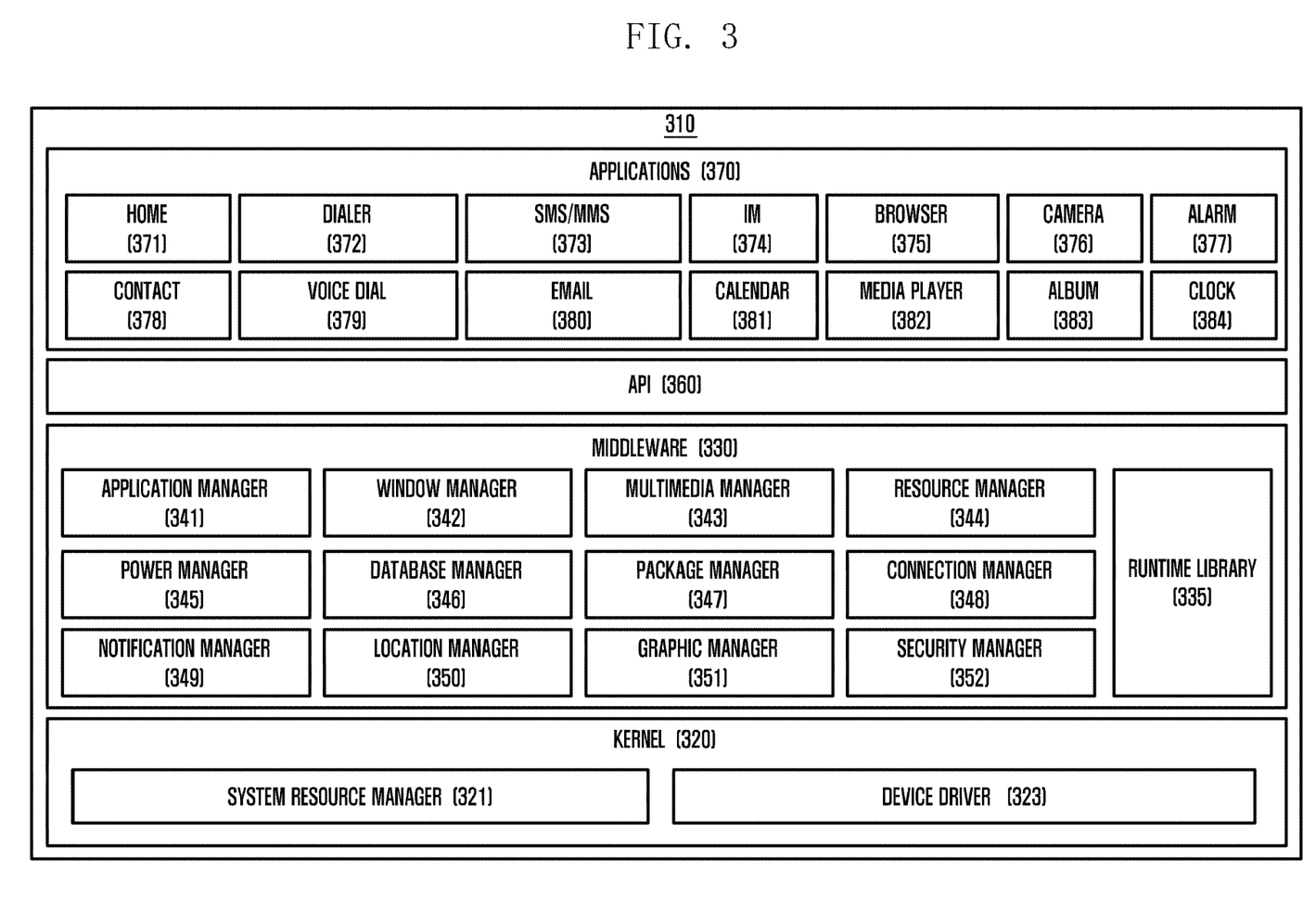
FIG. 3 is a block diagram illustrating an example configuration of a program module according to various example embodiments of the present disclosure.

FIG. 3 is a block diagram illustrating an example programming module 310 according to an example embodiment. The programming module 310 (for example, programming module 140) may be included (stored) in the electronic device 100 (for example, memory 130) illustrated in FIG. 1. At least some of the programming module 310 may comprise software, firmware, hardware, or any combination of software, firmware, and/or hardware. The programming module 310 may be executed in the hardware (for example, electronic device 201) to include an Operating System (OS) controlling resources related to the electronic device (for example, electronic device 101) or various applications (for example, applications 370) driving on the OS. For example, the OS may be Android, iOS, Windows, Symbian, Tizen, Bada or the like. Referring to FIG. 3, the programming module 310 includes a kernel 320, a middleware 330, an Application Programming Interface (API) 360, and applications 370.

The kernel 320 (for example, kernel 141) may include a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver.

The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 300 (for example, middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 includes, for example, a library module used by a complier to add a new function through a programming language while the application 370 is executed. According to an embodiment, the runtime library 335 executes input and output, management of a memory, a function associated with an arithmetic function and the like.

The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (for example, electronic device 100 or 200) has a call function, the middleware 330 may further include a telephony manager for managing a voice of the electronic device or a video call function.

The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (for example, API 145) is a set of API programming functions, and may be provided with a different configuration according to an operating system. For example, in Android or iOS, a single API set may be provided for each platform. In Tizen, two or more API sets may be provided.

The applications 370, which may include an application similar to the application 147, may include, for example, a preloaded application and/or a third party application. The applications 370 may include a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application.

At least a part of the programming module 310 can be implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 310, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4:
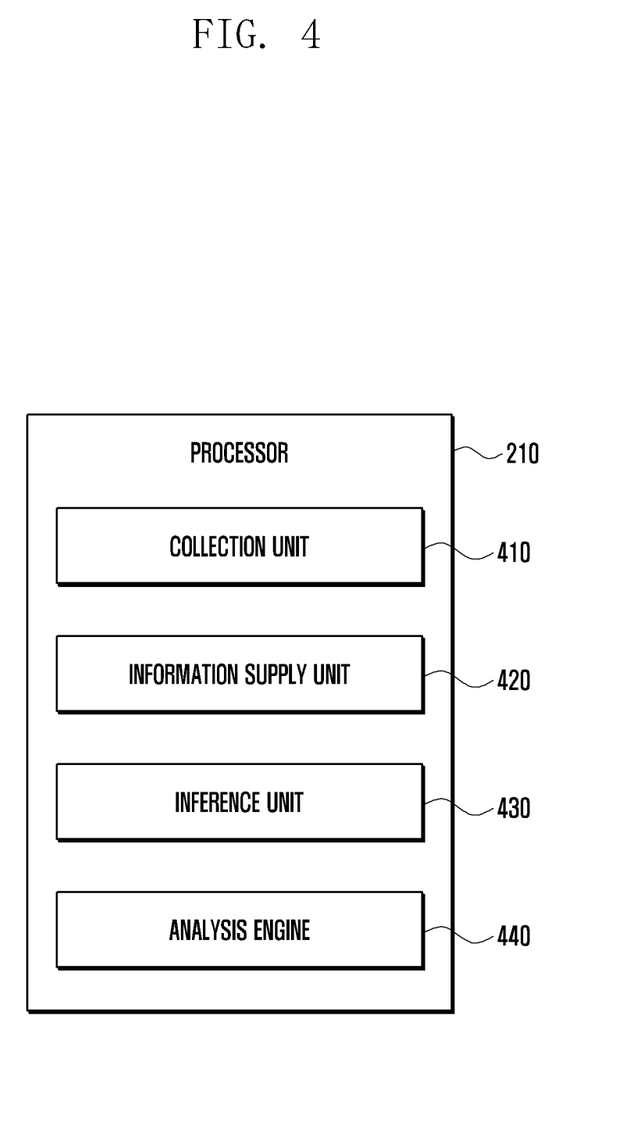
FIG. 4 is a block diagram illustrating an example configuration of the processor of FIG. 2.

FIG. 4 is a block diagram illustrating an example configuration of the processor 210 of FIG. 2.

According to the embodiment of FIG. 4, the processor may be identical in configuration with the processor 120 of FIG. 1.

The processor 210 may include various processing circuitry and/or program elements, such as, for example, and without limitation, a collection unit 410, an information supply unit 420, an inference unit 430, and an analysis engine 440.

The collection unit 410 may collect information generated and/or stored in the electronic device 201. For example, the information generated and/or stored in the electronic device 201 may include at least one of information collected by the sensor module 240, information transmitted/received by the communication module 220, location information collected by the GNSS module 227, information input by the user in the course of using an application 370 installed in the electronic device 201, and information received in association with the application 370 installed in the electronic device 201. The information input by the user or received in association with the application 370 may include schedule information, emails, phone numbers, alarm settings, and contact information that are input by means of the input device 250.

The collection unit 410 may collect the information generated and/or stored in the electronic device 201 and send the collected information to the analysis engine 440. The collection unit 410 may collect the information generated by the electronic device 201 and/or store the collected information in the memory 230.

According to an embodiment of the present disclosure, the collection unit 410 may collect the information generated and/or stored by the electronic device 201 and store the collected information in the memory 230.

The information supply unit 420 may receive a user input made, for example, by means of the input device 250 and send the information on the user input to at least one of the collection unit 410, the inference unit 430, and the analysis engine 440. The information supply unit 420 may process the information received from at least one of the collection unit 410, the inference unit 430, and the analysis engine 440 and then supply the processed information to the display 260.

The inference unit 430 may check the location information collected by the GNSS module 227 and determine the user situation based on the location information and the information received from the analysis engine 440. The inference unit 430 may determine a correlation between the location checked based on the collected location information and the user situation. The correlation between the user's location and the user's situation may include at least one of visit history, visit purpose, and visit frequency. The inference unit 430 may infer the affinity between the identified location and the user's situation. For example, if the user situation is that the user visits the location first or for the purpose of sightseeing, the inference unit 430 may determine that the user's affinity with the location is low. Also, if the user situation is that the user visits the location routinely, the inference unit 430 may determine that the user's affinity with the location is high.

The analysis engine 440 may generate information for use by the inference unit 430 based on the information (generated and/or stored in the electronic device 200) collected and/or stored by the collection unit 410 or the information which the communication module 220 acquires by means of an external search engine, and provide the inference unit 430 with the generated information.

According to various embodiments of the present disclosure, the processor 210 may collect the information generated and/or stored in the electronic device 201. For example, the information collected by the processor 210, e.g., information generated and/or stored in the electronic device 201, may, for example, and without limitation, include at least one of information collected by the sensor module 240, information transmitted/received by the communication module 220, location information collected by the GNSS module 227, information input by the user in the course of using an application 370 installed in the electronic device 201, and information received in association with the application 370 installed in the electronic device 201. The information input by the user or received in association with the application 370 may include, for example, and without limitation, schedule information, emails, phone numbers, alarm settings, and contact information that are input by means of the input device 250.

The processor 210 may collect the information generated and/or stored in the electronic device 201 and provide the analysis engine 440 with the collected information. The processor 210 may, for example, collect the information generated by the electronic device 201 and/or store the collected information in the memory 230.

According to an embodiment of the present disclosure, the processor 210 may collect the information generated and/or stored by the electronic device 201 and store the collected information in the memory 230.

The processor 210 may receive a user input made by means of the input device 250 and determine the location of the electronic device and the user situation based on the user input. The processor 210 may generate a screen with the location-based information in adaptation to the user situation and control the display 260 to display the generated screen.

The processor 210 may identify the location information collected by the GNSS module 227 and determine the user situation based on the location information and searched information or the information stored in the electronic device 201. The processor 210 may determine the correlation between the location identified based, for example, on the collected location information and the user situation. The correlation between the identified location and the user situation may include at least one of visit history, visit purpose, and visit frequency. The processor 210 may infer the affinity between the identified location and the user situation. For example, if the user situation is that the user visits the location first or for the purpose of sightseeing, the processor 210 may determine that the user's affinity with the location is low. Also, if the user situation is that the user visits the location routinely, the processor 210 may determine that the user's affinity with the location is high.

The processor 210 may identify the information necessary for use in a location-based information service based on the information generated and/or stored in the electronic device 201 or the information that the communication module 220 acquires by means of an external search engine.

Figure 5:
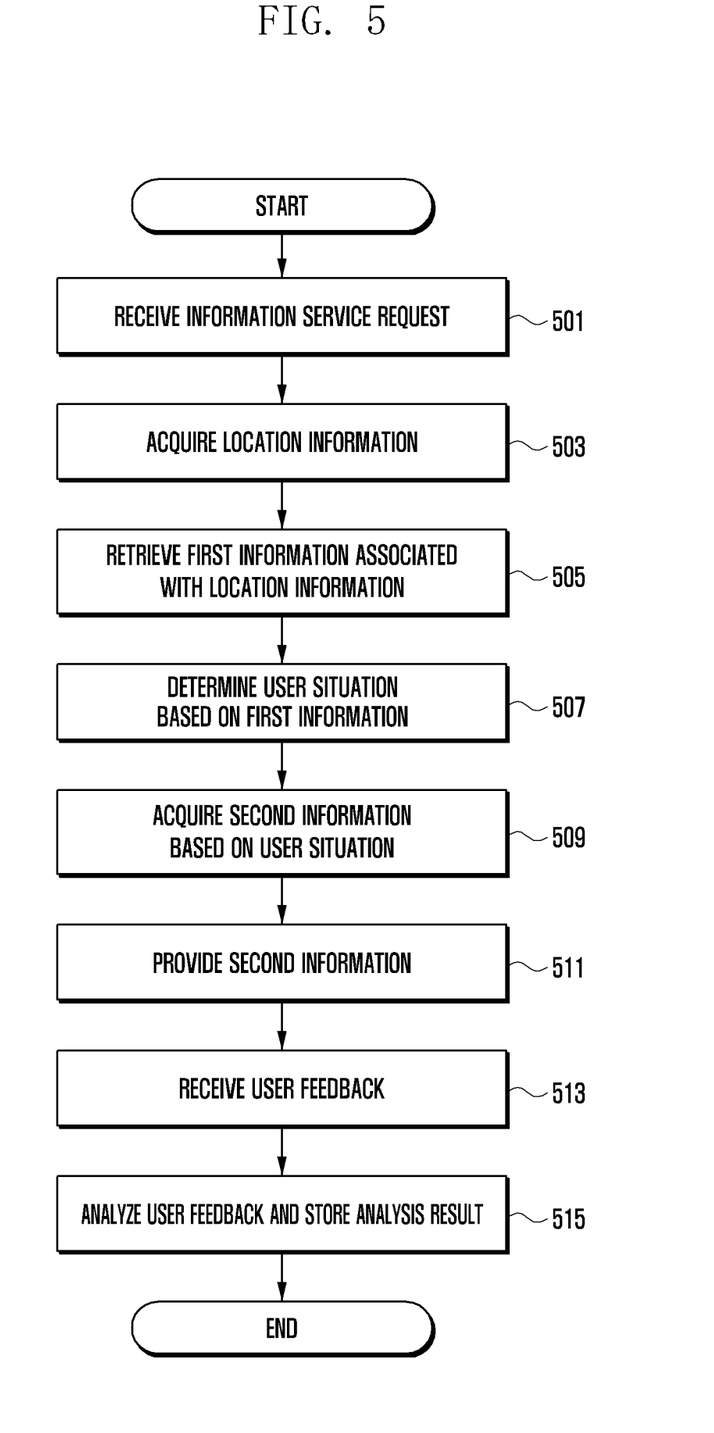
FIG. 5 is a flowchart illustrating an example location-based information service method with an electronic device according to various example embodiments of the present disclosure.

FIG. 5 is a flowchart illustrating an example location-based information service method with an electronic device according to various example embodiments of the present disclosure.

According to an embodiment of the present disclosure, the electronic device 201 may receive a user input made by means of the input device 250.

The processor 210 may receive an information service request input by a user at step 501. The information service request may, for example, be a location-based information service request.

The processor 210 may acquire the location information of the electronic device 201, for example, by means of the GNSS module 227 at step 503. The location acquired by the processor 210 may indicate the current location or desired location of the electronic device 201.

The processor 210 may retrieve first information associated with the identified location at step 505.

According to an embodiment of the present disclosure, the first information associated with the identified location may be used in inferring a user situation. The first information associated with the identified location information may be the information stored or generated in the electronic device 201 or the information collected by means of an external search engine. The first information associated with the identified location information may be raw data as the information stored or generated in the electronic device 201 or collected by means of an external search engine.

The processor 210 may determine the situation of the user of the electronic device 201 in association with the identified location based on the first information at step 507. For example, determination of the situation of the user of the location-associated electronic device may be made to indicate a high user affinity with the identified location for the case where the user frequently visits or roams the identified location. Also, the determination of the situation of the user of the location-associated electronic device may be made to indicate a low user affinity with the identified location for the case where the user infrequently visits or roams the identified location. Also, the determination of the situation of the user of location-associated electronic device may be made to indicate a low user affinity with the identified location for the case where the visit purpose is sightseeing or business.

At step 507, if, for example, there is information on a conference that the user is attending in association with the identified location in the information stored or generated in the electronic device 201, the processor 210 may infer that the user is located at the identified location for attending a conference. The user information associated with conferences may be acquired from a schedule application.

At step 507, if, for example, there is plane ticket reservation information associated with the identified location in the information stored or generated in the electronic device 201, the processor 210 may infer that the user is located at the identified location for sightseeing or business.

At step 507, the processor 210 may determine the user affinity to or correlation with the location acquired from the location information based on the visit purpose and visit frequency.

The processor 210 may acquire second information based on the determined user situation at step 509. The processor 210 may control the electronic device 201 to provide the user situation-adaptive location-based information service based on the information stored or generated in the electronic device or acquired by means of the external search engine. For example, the second information may be location-based information, location-based service, or location-based content. For example, if it is determined, for the user situation, that the identified location is associated with sightseeing, the processor 210 may search for travel information associated with the identified location or information on the route to a destination at step 509.

The processor 210 may provide the second information at step 511. At step 511, the processor 210 may generate a screen based on the second information and control the display 260 to display the generated screen to provide the second information to the user.

The processor 210 may receive a user feedback about the second information at step 513. At step 513, the processor 210 may receive the user feedback made about the second information by means of the input device 250. At step 513, the processor 210 may receive the user feedback indicating whether the second information is actually used.

The processor 210 may analyze the user feedback and store the analysis result in the memory 230 at step 515. The processor 210 may store the information on whether the user feedback about the second information is useful or actually used. The user feedback may be stored in the memory 230 as the information stored or generated in the electronic device 201.

Figure 6:
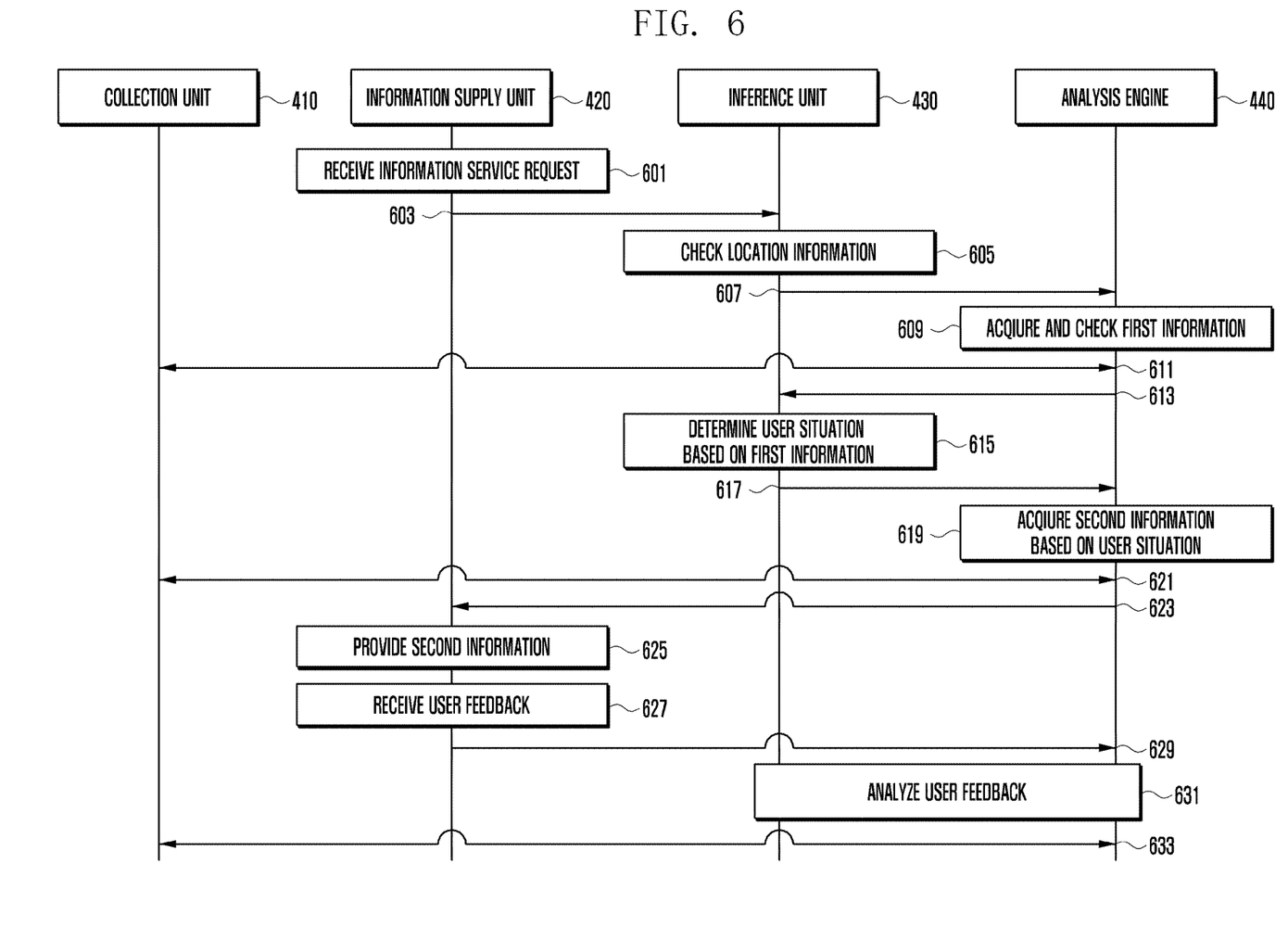
FIG. 6 is a signal flow diagram illustrating an example location-based information service method with an electronic device according to various embodiments of the present disclosure.

FIG. 6 is a signal flow diagram illustrating an example location-based information service method with an electronic device according to various example embodiments of the present disclosure.

The information supply unit 420 may receive an information service request input by the user at step 601. The information service request may be a location-based information service request.

The information supply unit 420 may send the information service request to the inference unit 430 at step 603.

If the information service request is received, the inference unit 430 may check the location information at step 605. The inference unit 430 may check the location information of the electronic device 200 by means of the GNSS module 227 of the electronic device 200 at step 605. The processor 210 may check the location information to identify the location of the electronic device 200, e.g., current location or desired location of the electronic device.

The inference unit 430 may send the identified location information to the analysis engine 440 at step 607.

The analysis engine 440 may acquire and check the first information based on the identified location information at steps 609 and 611. The first information acquired based on the identified location information may be necessary for inferring a user situation. The first information acquired based on the identified location information may be the information stored or generated in the electronic device 201 or collected by means of an external search engine. The first information acquired based on the identified location information may be raw data as information stored or generated in the electronic device 201 or collected by means of an external search engine.

The analysis engine 440 may send the first information to the inference unit 430 at step 613.

At step 615, the inference unit 430 may determine situation of the user of the electronic device 200 in association with the identified location based on the first information. For example, the analysis engine 440 may check the location information to identify the location of the electronic device based on the first information and make a determination of the situation of the user of the location-associated electronic device that indicates a high user affinity to the identified location for the case where the user frequently visits or roams the identified location. Also, the analysis engine 440 may make a determination of the situation of the user of the location-associated electronic device that indicates a low user affinity to the identified location for the case where the user infrequently visits or roams the identified location. Also, the analysis engine 440 may make a determination of the situation of the user of the location-associated electronic device that indicates a low user affinity to the identified location for the case where the visit purpose is sightseeing or business.

For example, if there is information on a conference that the user is attending in association with the identified location in the information stored or generated in the electronic device 201, the processor 210 may infer that the user is located at the identified location for attending the conference. The user information associated with conference may be acquired from a schedule application.

For example, if there is plane ticket reservation information associated with the identified location in the information stored or generated in the electronic device 201, the processor 210 may infer that the user is located at the identified location for sightseeing or business.

For example, the processor 210 may determine the user affinity to or correlation with the location acquired from the location information based on the visit purpose and visit frequency.

The inference unit 430 may send the information on the user situation to the analysis engine 440 at step 617.

The analysis engine 440 may acquire second information based on the user situation at steps 619 and 621. The analysis engine 440 may control the electronic device 201 to provide the user situation-adaptive location-based information service based on the information stored or generated in the electronic device or acquired by means of the external search engine. For example, the second information may be location-based information, location-based service, or location-based content.

For example, if it is determined, for the user situation, that the identified location is associated with sightseeing, the analysis engine 440 may search for the travel information associated with the identified location or information on the route to a destination at steps 619 and 621.

The analysis engine 440 may send the second information to the information supply unit 420 at step 623.

The information supply unit 420 may provide the second information at step 625. The information supply unit 420 may generate a screen based on the second information and provide the display 260 with screen data to display the generated screen.

The information supply unit 420 may receive a user feedback at step 627.

The information supply unit 420 may send the user feedback to the analysis engine 440 at step 629. At step 627, the information supply unit 420 may receive the user feedback indicating whether the second information is actually used. The inference unit 430 and the analysis engine 440 may analyze the user feedback at step 631. The collection unit 410 may perform control to store the analyzed user feedback in the memory 230 at step 633. The information on whether the user feedback about the second information is useful or actually used may be stored as the feedback information.

Figure 7:
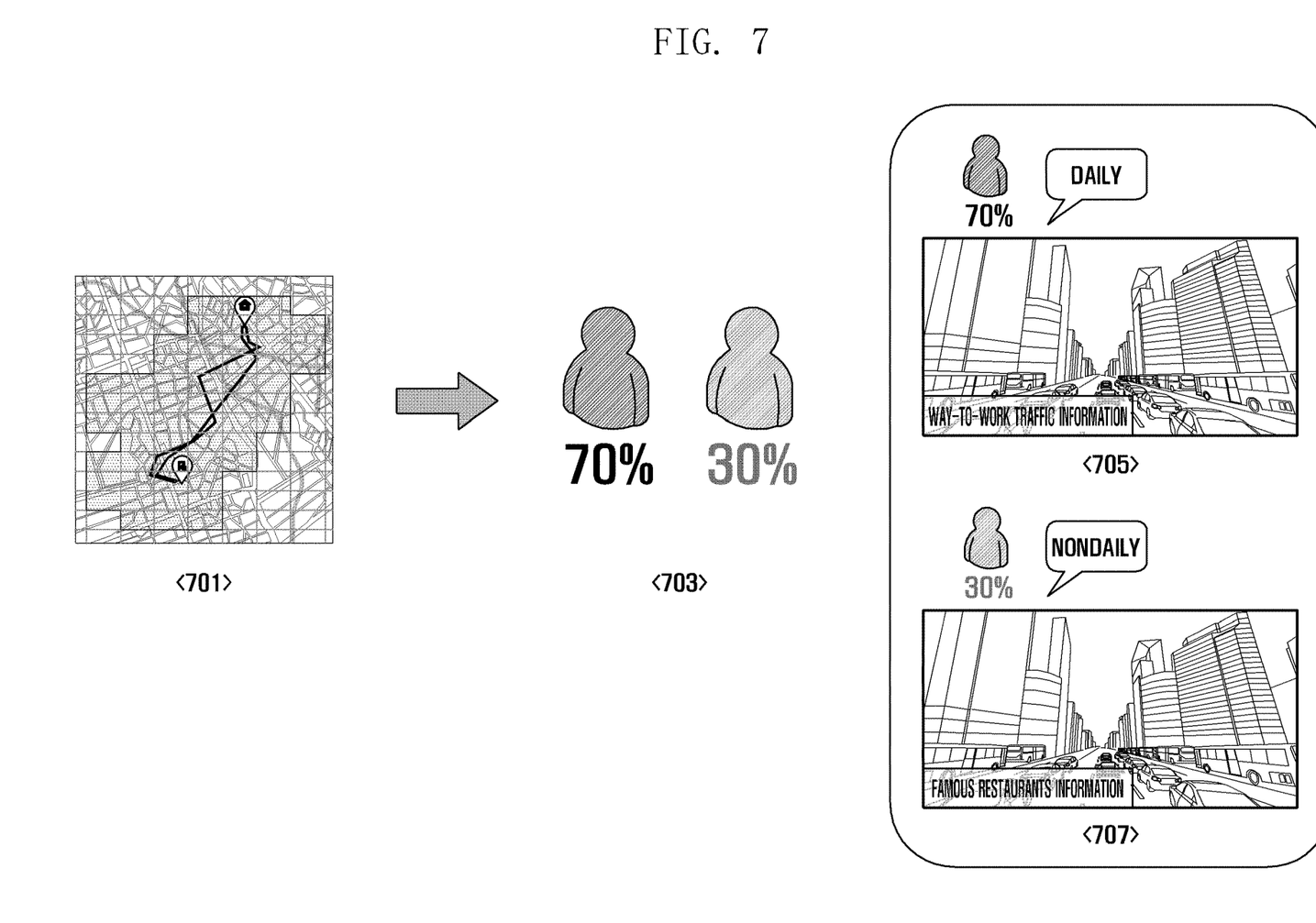
FIG. 7 is a diagram illustrating an example location-based information service method with an electronic device according to various example embodiments of the present disclosure.

FIG. 7 is a diagram illustrating an example location-based information service method with an electronic device according to various example embodiments of the present disclosure.

The electronic device 201 may receive an information service request for information on the location designated by the user as illustrated in part 701 of FIG. 7.

The electronic device 201 may determine a user situation in association with the identified location as illustrated in part 703 of FIG. 7. The user situation may be the information indicative of the frequency of roaming the location. For example, the electronic device 201 may determine the frequency of visiting the designated location stochastically. If the visit frequency to the identified location is high, the probability is high; if the visit frequency to the identified location is low, the probability is low.

If the visit frequency to the identified location is high, it may be possible to determine that the location is associated with daily life such that daily living information is provided as the location-based information as illustrated in part 705 of FIG. 7.

If the visit frequency to the identified location is low, it may be possible to determine that the location is associated with nondaily life such that nondaily living information is provided as the location-based information as illustrated in part 707 of FIG. 7.

Figure 8:
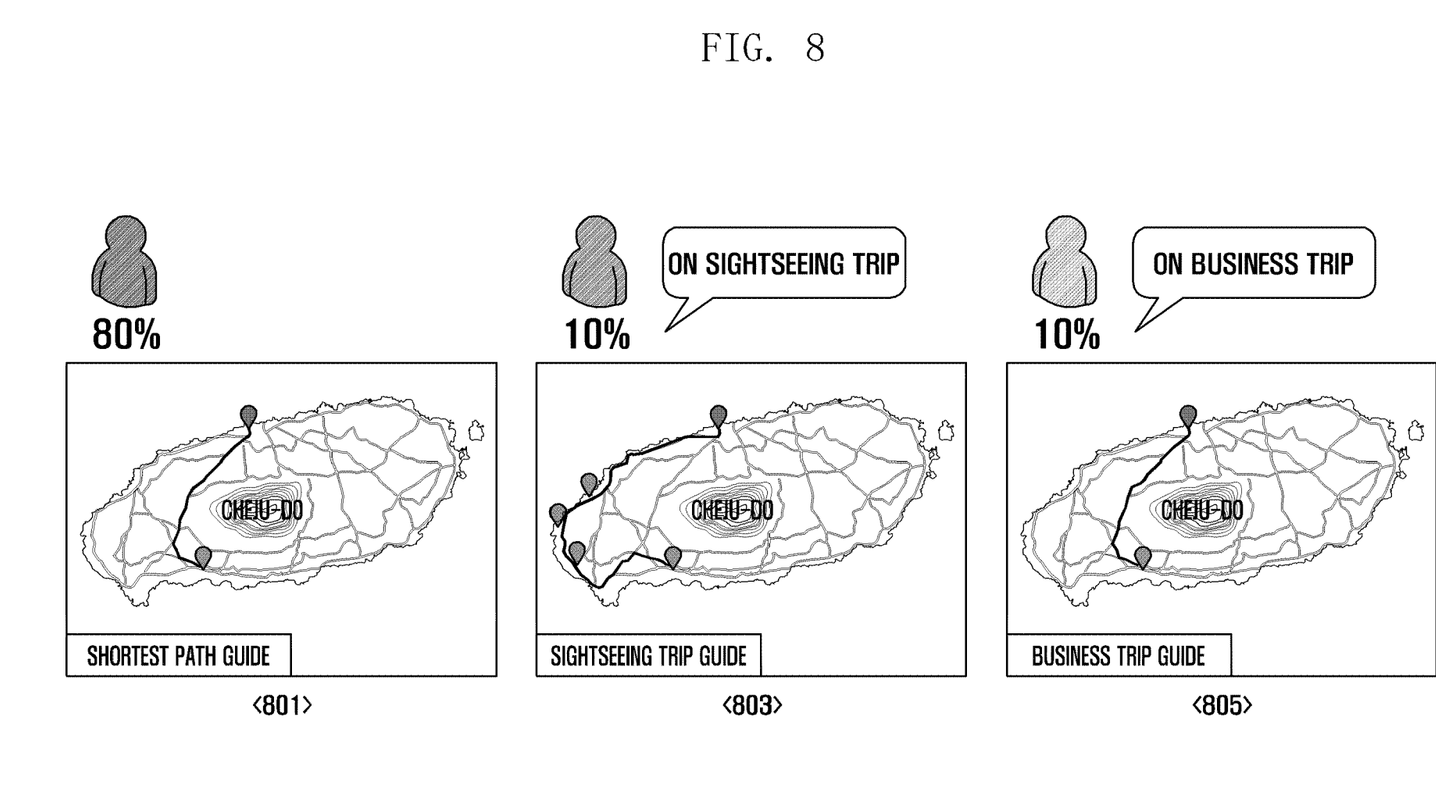
FIG. 8 is a diagram illustrating an example location-based information service method with an electronic device according to another example embodiment of the present disclosure.

FIG. 8 is a diagram illustrating an example location-based information service method with an electronic device according to another example embodiment of the present disclosure.

If the visit frequency to the identified location is high, it may be possible to determine that the corresponding location is associated with daily life such that the shortest path to the identified location is provided as the location-based information as illustrated in part 801 of FIG. 8.

If the visit frequency to the identified location is low, it may be possible to determine that the corresponding location is associated with nondaily life (e.g., trip) such that a travel path to the identified location is provided as the location-based information as illustrated in part 803 of FIG. 8.

Although it is determined that the identified location is associated with nondaily life because the visit frequency to the identified location is low, if the visit to the identified location is made for the purpose of attending a conference or business, it may be possible to provide the shortest path to the identified location as the location-based information as illustrated in part 805 of FIG. 8.

As described above, the electronic device and user situation-adaptive location-based information service method of the present disclosure is advantageous in terms of making it possible to provide the user with user location-based information service in such a way of determining a user situation based on user data and surroundings data of a device collected by the electronic device and providing the user with the location-based information service in adaptation to the user situation.

The term "module" according to the example embodiments of the disclosure, may refer to, but is not limited to, a unit of software, hardware, and firmware or any combination thereof and may be interchangeably used with the terms "unit," "logic," "logical block," "component," or "circuit." The term "module" may be the smallest unit of performing at least one function or a part thereof. A module may be implemented mechanically or electronically and may include, for example, and without limitation, at least one of a dedicated processor, a CPU, an Application-Specific Integrated Circuit (ASIC) chip, Field-Programmable Gate Arrays (FPGAs), and Programmable-Logic Device known or to be developed for certain operations.

According to various example embodiments of the present disclosure, at least part of the devices (e.g. modules or their functions) or methods (e.g. operations) may be implemented by computer program instructions stored in a computer-readable storage medium (e.g., memory 130). In the case that the instructions are executed by at least one processor (e.g. processor 120), the at least one processor may execute the functions corresponding to the instructions. The computer-readable storage medium may include, for example, and without limitation, a hard disk, a floppy disk, a magnetic medium (e.g. magnetic tape), an optical medium (e.g. CD ROM DVD ROM), magneto-optical medium (e.g., floptical disk), and internal memory. The programs commands may include codes created by a compiler or executable by an interpreter. According to various example embodiments of the present disclosure, a module or programming module may include at least one of the aforementioned components with omission of some components or addition of other components. According to various embodiments of the present disclosure, the operations of the modules, programming modules, or other components may be executed in series, in parallel, recursively, or heuristically; or at least part of the operations may be executed in a different order with omission of some operations or addition of other operations.

While the disclosure has been described with reference to various example embodiments thereof, it will be understood that various changes may be made without departing from the spirit and scope of the disclosure as set forth, for example, in the appended claims.

What is claimed is:

1. A location-based information service method of an electronic device, the method comprising:
   receiving, at the electronic device, a location-based information service request identifying a location;
   checking, upon receipt of the location-based information service request, location information of the electronic device;
   retrieving first information stored by the electronic device and associated with the identified location;
   determining a situation of a user of the electronic device in association with the identified location based on the first information, the situation of the user comprising information involving frequency of the user visiting the identified location and a purpose of visiting the identified location obtained based on information from a scheduling application on the electronic device;
   generating second information including a path to the identified location based on each of the frequency of the user visiting the identified location, the purpose of visiting the identified location, and the location information of the electronic device; and
   providing the user with the second information.

2. The method of claim 1, wherein determining the situation of the user comprises determining a correlation between the first information and the identified location, and the second information is generated based on the correlation.

3. The method of claim 1, further comprising:
   receiving a user feedback about the second information;
   analyzing the received user feedback; and
   storing analysis results.

4. The method of claim 1, wherein the first information is generated by the electronic device.

5. The method of claim 1, wherein the first information is acquired using an external search engine.

6. The method of claim 1, wherein providing the user with the second information comprises:
   generating a screen with the second information; and
   displaying the screen on a display.

7. The method of claim 1, wherein the second information is generated and/or stored by the electronic device.

8. The method of claim 1, wherein the second information is acquired using an external search engine.

9. The method of claim 1, wherein determining the situation of the user comprises determining a correlation between the first information and the identified location.

10. The method of claim 1, wherein generating the second information comprises acquiring the second information in association with the identified location based on the user situation.

11. An electronic device comprising:
a memory;
an input device comprising input circuitry;
a display;
a communication module comprising communication circuitry; and
a processor configured to:
    control the communication module to receive a location-based information service request identifying a location;
    check location information of the electronic device upon receipt of the location-based information service request;
    retrieve first information stored by the electronic device and associated with the identified location;
    determine a situation of a user of the electronic device in association with the identified location based on the first information, the situation of the user comprising information involving frequency of the user visiting the identified location and a purpose of visiting the identified location obtained based on information from a scheduling application on the electronic device;
    generate second information including a path to the identified location based on each of the frequency of the user visiting the identified location, the purpose of visiting the identified location, and the location information of the electronic device; and
    provide the user with the second information.

12. The electronic device of claim 11, wherein determining the situation of the user comprises determining a correlation between the first information and the identified location, and the second information is generated based on the correlation.

13. The electronic device of claim 11, wherein the processor is configured to receive feedback about the second information, wherein the input device is configured to receive an input indicative of the feedback, the processor being further configured to analyze the received feedback, and to store analysis results in the memory.

14. The electronic device of claim 11, wherein the electronic device is configured to generate the first information.

15. The electronic device of claim 11, wherein the electronic device is configured to acquire the first information using an external search engine.

16. The electronic device of claim 11, wherein the processor is configured to generate a screen including the second information and to control the display to display the screen.

17. The electronic device of claim 11, wherein the electronic device is configured to generate and/or store the second information.

18. The electronic device of claim 11, wherein the electronic device is configured to acquire information for generating the second information using an external search engine.

19. The electronic device of claim 11, wherein the processor is configured to determine a correlation between the first information and the identified location.

20. The electronic device of claim 11, wherein the processor is configured to acquire the second information in association with the identified location based on the user situation.

* * * * *